United States Patent [19]
Rhodes et al.

[11] Patent Number: 5,923,364
[45] Date of Patent: Jul. 13, 1999

[54] VIDEO SECURITY SYSTEM

[75] Inventors: Scott Anthony Rhodes, Wannero, Australia; Andrew William Jackson, Las Vegas, Nev.

[73] Assignee: Maxpro Systems Pty Ltd, Australia

[21] Appl. No.: 09/061,281

[22] Filed: Apr. 17, 1998

Related U.S. Application Data

[62] Division of application No. 08/750,921, Jan. 22, 1997, Pat. No. 5,745,166, filed as application No. PCT/AU95/00457, Jul. 26, 1995.

[30] Foreign Application Priority Data

Jul. 26, 1994 [AU] Australia ............................ PM7083
Aug. 17, 1994 [AU] Australia ............................ PM7531

[51] Int. Cl.[6] .................................................. H04N 7/18
[52] U.S. Cl. .................... 348/159; 348/213; 348/518; 360/5; 386/35
[58] Field of Search ........................ 348/143, 159, 348/153, 479, 563, 600, 213, 518; 360/5; 386/35; H04N 7/18

[56] References Cited

U.S. PATENT DOCUMENTS

| | | | |
|---|---|---|---|
| 3,689,695 | 9/1972 | Rosenfield et al. | 348/148 |
| 3,848,082 | 11/1974 | Summers | 348/473 |
| 4,148,069 | 4/1979 | Smiley et al. | 348/707 |
| 4,244,006 | 1/1981 | Kitahara et al. | 348/213 |
| 4,566,036 | 1/1986 | Kadosawa | 348/213 |
| 4,890,713 | 1/1990 | Pagano | 348/143 |
| 4,945,367 | 7/1990 | Blackshear | 348/143 |
| 5,150,212 | 9/1992 | Han | 348/705 |
| 5,206,732 | 4/1993 | Hudson | 348/207 |
| 5,428,390 | 6/1995 | Cooper et al. | 348/240 |
| 5,642,160 | 6/1997 | Bennett | 348/156 |
| 5,745,166 | 4/1998 | Rhodes | 348/143 |

FOREIGN PATENT DOCUMENTS

| | | |
|---|---|---|
| 0 525 482 A2 | 2/1993 | European Pat. Off. . |
| 61-273086 | 12/1986 | Japan . |
| 61-280183 | 12/1986 | Japan . |
| 2-78384 | 3/1990 | Japan . |
| 2-172371 | 7/1990 | Japan . |
| 3-190382 | 8/1991 | Japan . |
| 4-53368 | 2/1992 | Japan . |
| 5-30507 | 2/1993 | Japan . |
| 5-176217 | 7/1993 | Japan . |
| 5-268509 | 10/1993 | Japan . |
| 5-276511 | 10/1993 | Japan . |
| 1 370 535 | 10/1974 | United Kingdom . |
| 2 238 926 | 6/1991 | United Kingdom . |
| 2 241 627 | 9/1991 | United Kingdom . |
| 2 251 704 | 7/1992 | United Kingdom . |
| 2252473 | 8/1992 | United Kingdom . |

*Primary Examiner*—Howard Britton
*Attorney, Agent, or Firm*—Nixon & Vanderhye

[57] ABSTRACT

A video security system (10) capable of monitoring and recording fixed and moving targets and recording management information into a video signal such that the text can be removed from the video image produced by the video signal at playback of the recorded video signal. The VSS (10) allows a camera (70b) to switch (toggle) between two or more view positions of interest and to set the view positions into memory by pressing a single switch. The cameras (70b) are controlled to move rapidly, but accurately, between the positions within controlled parameters of speed and acceleration—including a period of substantially zero acceleration between changes in the rate of acceleration.

26 Claims, 8 Drawing Sheets

*Fig. 1B*
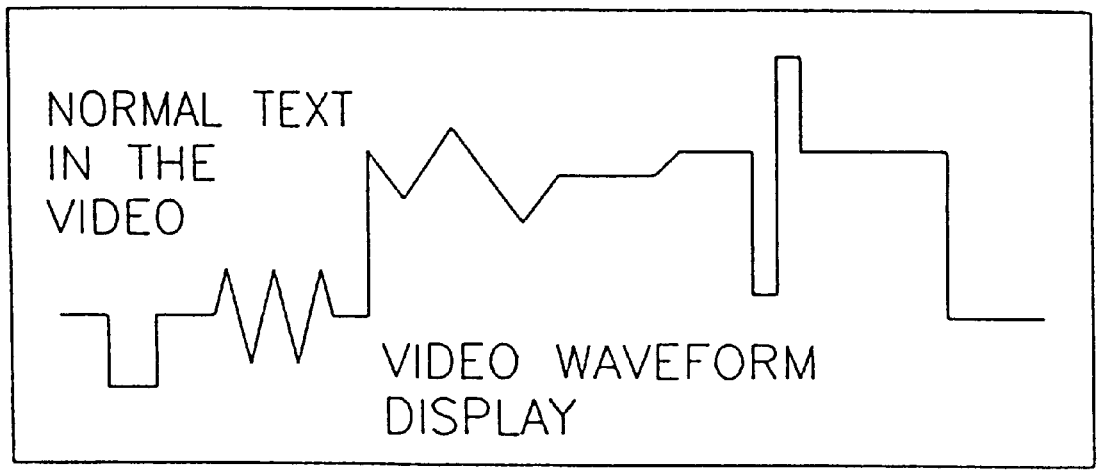
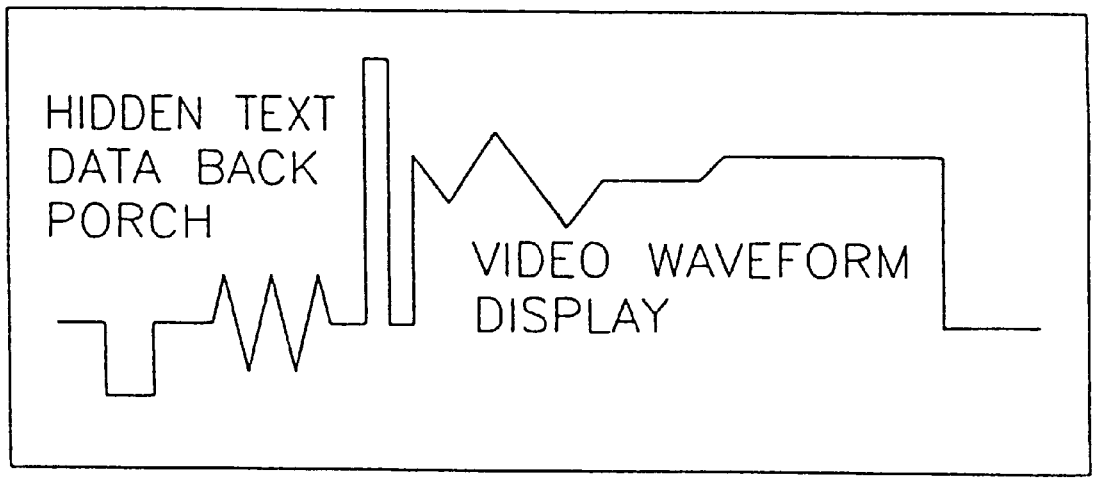
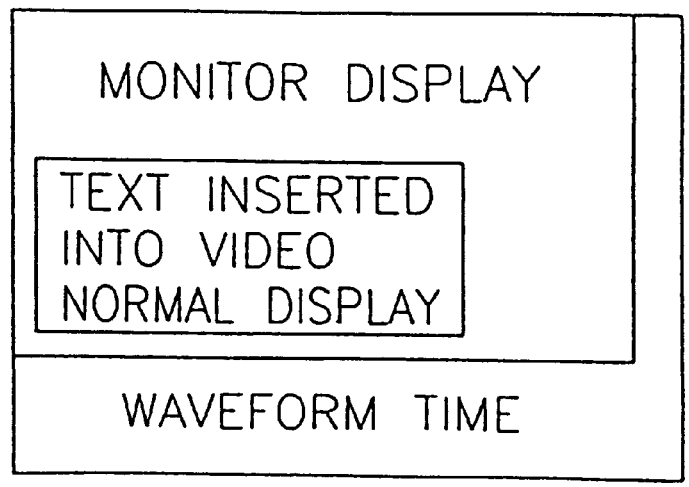

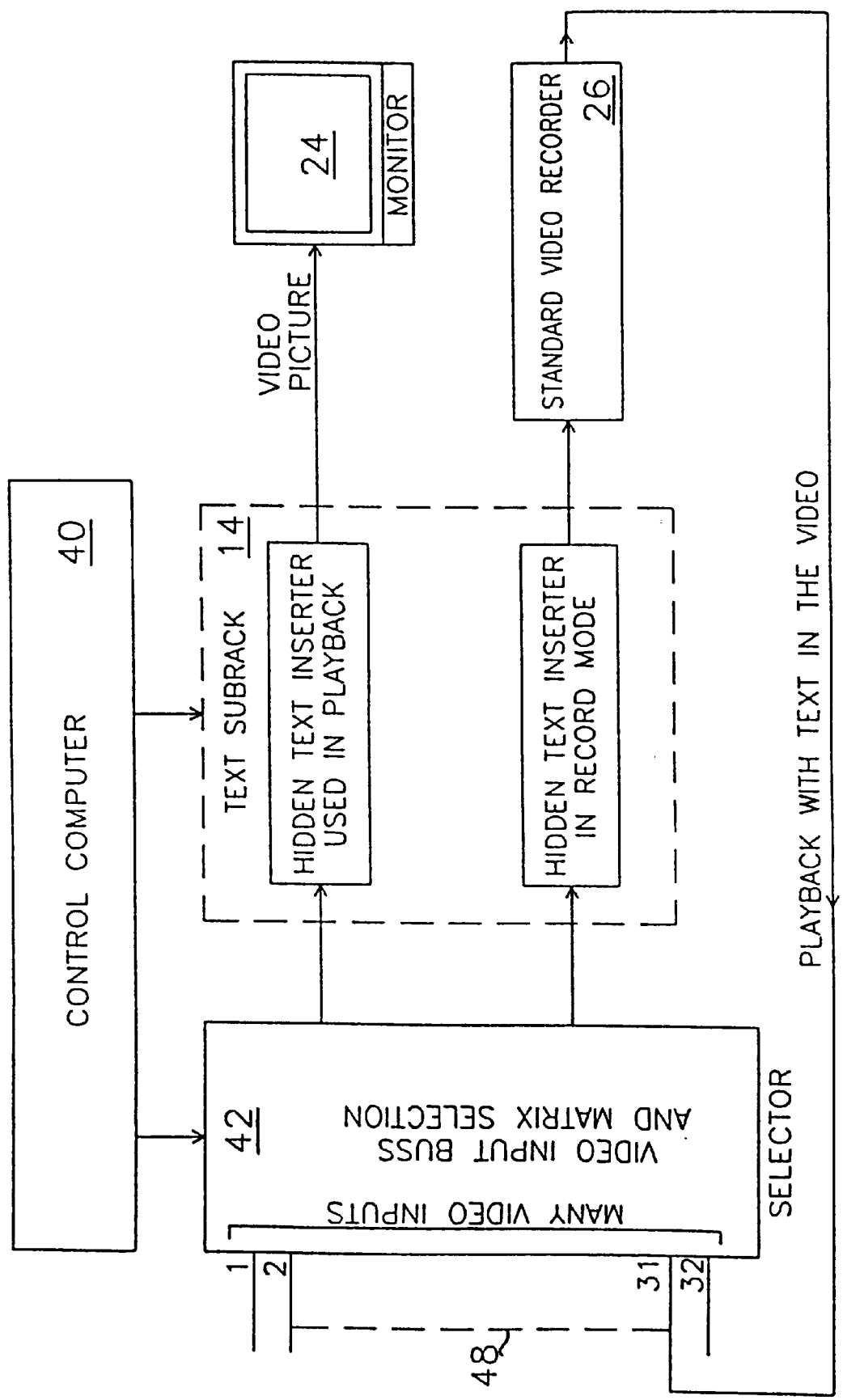

VIDEO SECURITY SYSTEM

This is a division of application Ser. No. 08/750,921, filed Jan. 22, 1997, now U.S. Pat. No. 5,745,166 which is a 371 of PCT/AU 95/00457 file Jul. 26, 1995.

FIELD OF THE INVENTION

The present invention relates to a video security system particularly, although not exclusively, envisaged for use in the monitoring of a plurality of locations, such as, in a building, for example, a casino.

More particularly the present invention relates to a video security system (VSS) particularly directed at addressing the difficulties which prior art security systems generally experience, such as:

1. avoiding text information obliterating important video information;
2. switching repeatedly between two or more views of interest with a single camera;
3. dealing with equalisation problems between video cameras, video monitors and/or VCRs or other video signal recording device;
4. overcoming the problem of tracking an object with a camera when it approaches a 360° end stop;
5. overcoming the problem of pan/tilt camera control when zoomed out;
6. controlling the camera to move rapidly between two or more views of interest; and,
7. VCR management issues including: failure of VCRs; change-over delay in VCR cassettes; and dealing with camera failure and replacement.

It is to be kept in mind that the purpose of the video security system of the present invention is to provide video images regarding events pertaining to the security of a building or the like and to allow those recorded video images to be presentable in a court of law as irrefutable evidence of the events which took place.

Hereinafter the term "VCR" ill be used to denote any form of video signal recording and/or playback device (referred to as a "VRD") and may include a video cassette recorder, or any optical or digital recording media suitable for recording video signals.

BACKGROUND OF THE INVENTION

1. "Text Overlay"—In the field of video security systems it is known to introduce text into the video signal to provide a real time record of the details of the event which is being monitored. A disadvantage of such prior art systems is that the information is introduced into the video part of the video signal and hence over-writes a part of the video picture which would have otherwise been recorded.

The present invention overcomes this by inserting the text into the non-video part of the video signal 2. "Toggle"—The secret to the success of switching between a plurality of fixed locations is to be able to quickly and easily identify two, or more, viewing locations "on the fly". This is particularly for viewing targets of short term or temporary interest.

In the context of the present invention "on the fly" means to be performed whilst the VSS is in its normal mode of operation and without interrupting the normal operation of the VSS.

Also, in the context of the present invention the feature of "switching back and forth between two (or more) viewing locations" is referred to as "toggling" between the viewing locations.

However, where the operator is interested in two or more specific locations within the viewing region the PTZ camera must be adjusted manually between these locations. This is quite laborious and tedious for the person operating the PTZ camera since it involves adjusting the pan, tilt, zoom and focus setting for the PTZ camera.

We have discovered that this can be overcome by recording the PTZ camera settings corresponding to the desired locations of viewing into a camera position controller and switching between the locations by recalling the settings for each of the viewing locations. The PTZ camera then is controlled by the camera position controller to adjust itself between the desired locations.

"Preset" PTZ camera viewing locations are known and are widely used, however, they require the operator to make several control operations to set each viewing location and at least two control operations to switch from one viewing location to another.

This is particularly inconvenient in a viewing region such as in a casino where there are many potential targets, where there is a requirement to quickly and reliably set viewing locations and where it is critical to be able to switch between typically two targets. The two targets would typically be a suspected felon and a handbag which it is suspected that the felon will steal. Typically, there is an accomplice to be monitored as well. Usually the accomplice in this scenario is a woman who collides briefly with the felon and takes the handbag once the handbag has been stolen. Hence, the task of the operator of the VSS is to first monitor the suspected felon and the handbag by toggling back and forth between the two and once the handbag has been stolen to monitor the felon and then to monitor a person who may collide with the felon.

In the present invention we have determined a way to enable the operator to operate a single control function (such as by a control button) to set, update and toggle between two or more viewing locations. This most reliably and efficiently allows the operator to monitor the targets.

3. "Signal Equalisation"—Prior art video security systems have the problem that equalisation of the video signals must be provided for each video camera. That is, there must be one equalisation unit for each camera.

We have overcome this difficulty by having one equalisation unit for each video monitor and automatically adjusting the equalisation unit for each video camera as it is connected to the monitor. Hence, only a fraction of the number of equalisation units is required.

4. "Rotation End Stops"—Another problem of existing video security systems is that most of the cameras which they use are only able to rotate through about 360°. Hence, when following a target the camera can reach its end stops and have to unwind before it can continue to follow the target. By the time that the camera has unwound the target may no longer be in sight.

We have overcome this problem in an inexpensive way by using a cable loop wound in a way that it is able to twist 3 to 4 times, and hence the camera can be rotated through an angle of about 1000°. A control unit of the camera then is programmed to return the camera to about the centre of its rotation when the camera is not being used to track a target. Hence, the camera is relatively unlikely to reach its end stops during normal use.

5. "Pan Speed vs Zoom"—Prior art vide cameras have the further problem that when the lens is zoomed in (that is viewing an object at a distance) the rate of pan per degree of arc is the same as when the lens is zoomed out. Hence, it becomes difficult to accurately control the pan of the lens when zoomed in. Also, it is difficult to observe the image of the camera during panning when zoomed in because it is usually blurred or indistinct due to the pan speed being too high.

We have overcome this problem by linking the pan speed to the zoom position of the lens so that the rate of pan per degree of arc decreases as the lens is zoomed in and increased as the lens is zoomed out.

6. "Accuracy of Camera Positioning"—Conventional camera position controllers have problems in maintaining accuracy of positioning of the video camera (for viewing a target in a predetermined location) whilst seeking maximum speed of movement of the video camera. That is, in the race for maximum speed, so that one camera can be used to monitor two or more locations, the position controller is not able to keep accurate record of the location of the camera. This is primarily due to problems encountered in rapid changes in acceleration.

We have overcome this problem by designing a camera position controller which ensures that there is a minimum period of substantially zero acceleration before any change in acceleration direction. This thus avoids large changes in momentum introduced when switching abruptly from acceleration to deceleration.

7. "Non-Recording Time"—Another problem of prior art video security systems is that during the times referred to in item 7 of the Field of the Invention no recording can occur. Hence, the video security system can not record all events which its cameras see. For example, in a video security system having 125 VCRs there would be a minimum recording time loss of 2 hours per day due only to the time taken to change over tapes (assuming the operation takes 30 seconds and each tape records for 8 hours). There is further loss of recording when an operator deliberately takes a VCR off-line in order to review one of the tapes.

In order to overcome these periods of lost recording we have designed a VSS to automatically manage the VCRs and cameras so as to ensure that each target is monitored continuously and each video signal is recorded continuously. This is achieved by using backup video cameras and backup VCRs and by providing a log of the camera and VCR associated with each viewed target.

SUMMARY OF THE INVENTION

Therefore it is an object of the present invention to provide a video security system to overcome the above identified problems.

1. It is an object of the present invention to provide a text insertion system which enables storage of text other than in the part of the video signal which corresponds to the video image.

In accordance with another aspect of the present invention there is provided a text insertion system for a video security system having a video camera and a video monitor and/or a VRD capable of operation in a record mode, the text insertion system comprising:

a text insertion means connected between the video camera and the video monitor and/or VRD for inserting a text signal into a video signal received from the video camera for display on the video monitor and/or recordal by the VRD, the insertion of the text signal being timed within the back porch of the video signal so that the text signal does not alter the visible part of the video frame of the video signal;

a control means connected to the text insertion means, the control means generating the text signal and sending the text signal to the text insertion means; and, a playback means operatively associated with the text insertion means and the control means, the playback means responding to the text signal portion of the video signal, the playback means having a text signal display means for rendering the text signal visible on the video monitor, and a text signal hiding means for rendering the text signal non-visible on the video monitor, the text signal display means and the text signal hiding means being operable by a person using the text insertion system to allow alternating between showing text corresponding to the text signal on the video monitor and showing on the video monitor that part of the video frame which would otherwise be obscured by the text, and the playback means being able to make the text signal visible or hidden during both recording and playback modes of operation of the VRD.

2. Therefore, it is an object of the present invention to provide a PTZ camera for a video security system which is capable of being controlled by an operator to toggle between a plurality of desired camera viewing locations.

In accordance with one aspect of the present invention there is provided a PTZ camera for viewing a plurality of targets within a region surrounding the PTZ camera, the PTZ camera comprising:

a video lens and camera for viewing the targets and sending a video signal to a video monitor and or a VRD;

a zoom control means for controlling the video lens for viewing the targets;

a focus control means for focusing the video lens for viewing the targets;

a pan control means for panning the video lens and camera for viewing the targets;

a tilt control means for tilting the video lens and camera for viewing the targets; and, a camera position control means for controlling the video lens, the zoom control means, the focus control means, the pan control means and the tilt control means, the camera position control means having a first current position means for storing the settings corresponding to the location of one of the targets, and a second current position means for storing the settings corresponding to the location of another one of the targets, the camera position control means being operable to switch control between the first current position means and the second current position means for allowing viewing to switch between two targets of present interest, wherein the first current position means and the second current position means are operatable to set, update and toggle the view on the video monitor between the two locations of the targets.

3. It is an object of the present invention to provide a transmission cable equalisation system for a video security system having a plurality of video cameras and a video monitor and/or a VRD capable of operation in a record mode, the transmission cable equalisation system comprising:

a selector means connected between the video cameras and the video monitor and/or VRD for selecting video signals from the video cameras to be directed to the video monitor and/or VRD so that the video signal from one video camera is display on the video monitor and/or recorded on the VRD at a time;

an equaliser means connected between the selector means and the video monitor and/or VRD for equalising the video signal from losses caused by the nature of the connection between each of the video cameras and the selector means; and, a control means connected to the equaliser means and the selector means, the control means having a reference means having data quantifying the losses between each video camera and the selector means, and the control means controlling the equaliser means to compensate for the losses associated with each video camera as its video signal is displayed on the video monitor and/or recorded on the VRD so that the condition of the video signal at the video monitor and/or VRD is equalised substantially independent of the characteristics of the connection between the video camera and the selector means so that only one equalisation means is required per video monitor and/or VRD instead of one equalisation means per video camera.

4. It is an object of the present invention to provide a video camera which is controllable to rotate through a fixed angle which is greater than 360°.

In accordance with a still further aspect of the present invention there is provided a video camera for a video security system, the video camera comprising:

a video lens for viewing a target and sending a video signal to a video monitor and/or a VRD;

a transport mechanism upon which the video lens is mounted, the transport mechanism being rotatable through a fixed azimuth range of greater than 360° so that the video lens can view targets which move through an azimuth range of greater than 360°, and, a loop of electrical cables arranged to be able to twist through an azimuth range of greater than 360°.

5. It is an object of the present invention to provide a video camera which is controllable to pan at a speed which changes corresponding to the zoom setting of the camera.

In accordance with yet another aspect of the present invention there is provided a video camera comprising:

a video lens for viewing a target and sending a video signal to a video monitor and /or a VRD;

a zoom control means for controlling the video lens to see targets at varying ranges from the video camera;

a pan control means for panning the video lens; and, a control means for controlling the speed at which the video lens is panned, the control means being able to set a relatively slow pan speed when the zoom control means controls the video lens to view a target which is relatively far from the video lens and to set a relatively high pan speed when the zoom control means controls the video lens to view a target which is relatively close to the video lens so that both distant and close targets can be panned over at substantially the same speed.

6. It is an object of the present invention to provide a camera transport mechanism which has a camera position control system for moving a camera rapidly between a plurality of viewing positions.

In accordance with a further aspect of the present invention there is provided a camera transport mechanism for moving a video camera between a plurality of viewing positions, the camera transport mechanism comprising:

a platform for carrying a video camera;

a vertical axis drive unit attached to the platform for moving platform about a vertical axis;

a horizontal axis drive unit attached to the platform for moving the platform about a horizontal axis; and, a camera position control system for recording the location of a plurality of viewing positions and for controlling the movement of the platform between said viewing positions, the camera position control system being configured control the movement of the platform so as to provide a minimum period during which there is substantially zero acceleration between changes in acceleration of the platform from acceleration to deceleration so as to reduce the amount of rate of change of momentum experienced by the platform and thus improve the accuracy of determination of the position of the platform so as to more accurately control the movement of the platform and hence the video camera between the viewing positions.

7. It is an object of the present invention to provide a video camera substitution system for ensuring that video images are always available to be reviewed and/or recorded even in the event of the failure of a video.

In accordance with a still further aspect of the present invention there is provided a video camera substitution system for a video security system having a fixed video camera for viewing a target area, a pan-tilt video camera capable of orientation to substantially view the said target area and a video monitor and/or VCR capable of operation in a record mode, the video camera substitution system comprising:

a failure detection means for detecting failure of the fixed video camera;

a camera preset means having data concerning the position of the target area with respect to the pan-tilt video camera; and, a control means in operative association with the failure detection means, the camera preset means and the pan-tilt video camera, the control means being capable of controlling the pan-tilt video camera for moving and setting the pan-tilt video camera to monitor the target area when the failure detection means detects failure of the fixed video camera so that the target are a is monitored substantially continuously.

It is an object of the present invention to provide a video recorder substitution system for ensuring that video images a nd al ways recorded even in the event of the failure of a video recorder including failure to record due to changeover of recording media and taking the video recorder out of service.

In accordance with a still further aspect of the present invention there is provided a video recorder substitution system for a video security system comprising:

a first VRD for recording a video signal corresponding to a target area;

a second VRD also capable of recording the video signal corresponding to said target area;

a record failure detection means for detecting failure of the first VRD to record said video signal, including failure due to change-over of recording media and due to taking the video recorder out of record its mode of operation; and, a control means in operative association with the record failure detection means, with the first VRD and with the second VRD, the control means being capable of controlling the second VRD to set the second VRD to record said video signal in the event that the record failure detection means detects failure of the first VRD so that the video signal corresponding to the target area is recorded substantially continuously.

BRIEF DESCRIPTION OF THE DRAWINGS

An exemplary embodiment of the present invention will now be described with reference to the accompanying drawings in which.

FIG. 1B is a set of waveforms showing the nature of insertion of a signal corresponding to text into the video signal;

FIG. 3 is block diagram of a text insertion system in accordance with the present invention;

DETAILED DESCRIPTION OF THE PREFERRED EMBODIMENT(S)

Video Security System

Figure 1A:
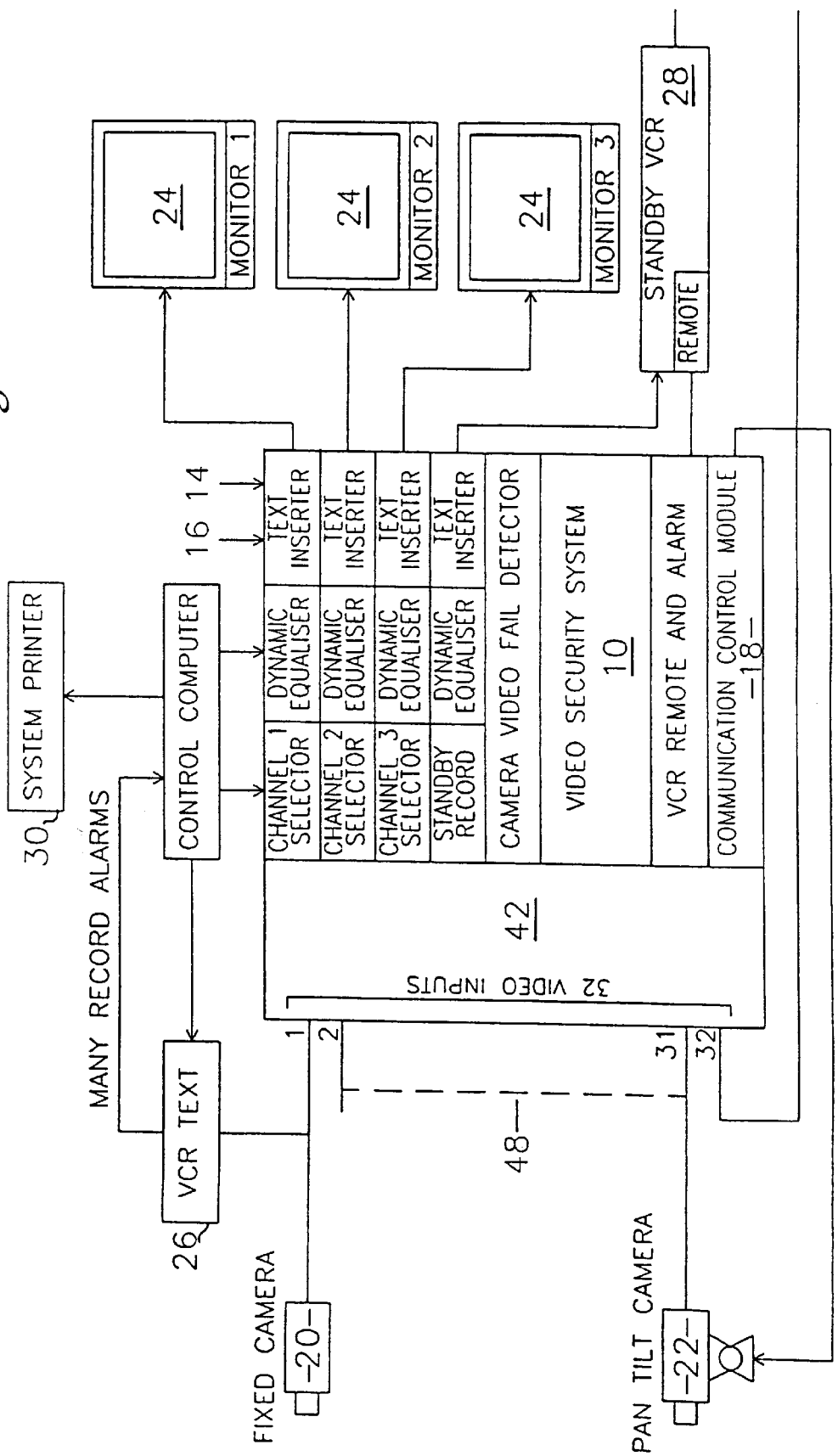
FIG. 1A is block diagram of a video security system in accordance with the present invention.

In FIG. 1 there is shown a Video Security System (VSS) 10 comprising an Automatic VCR Management System (AVCRMS) 12, a Text Insertion System (TIS) 14, a Transmission Cable Equalisation System (TCES) 16 and a Video Camera Substitution System (VCSS) 18.

The VSS 10 also comprises a plurality of fixed position cameras 20, a plurality of pan-tilt cameras 22, a plurality of video monitors 24, a plurality of VCRs 26, one or more standby VCRs 28 and a printer 30.

Typically, the VSS 10 is embodied in a computer system programmed to effect various routines equivalent to the systems 12, 14, 16 and 18 described herein.

Automatic VCR Management System

Figure 2:
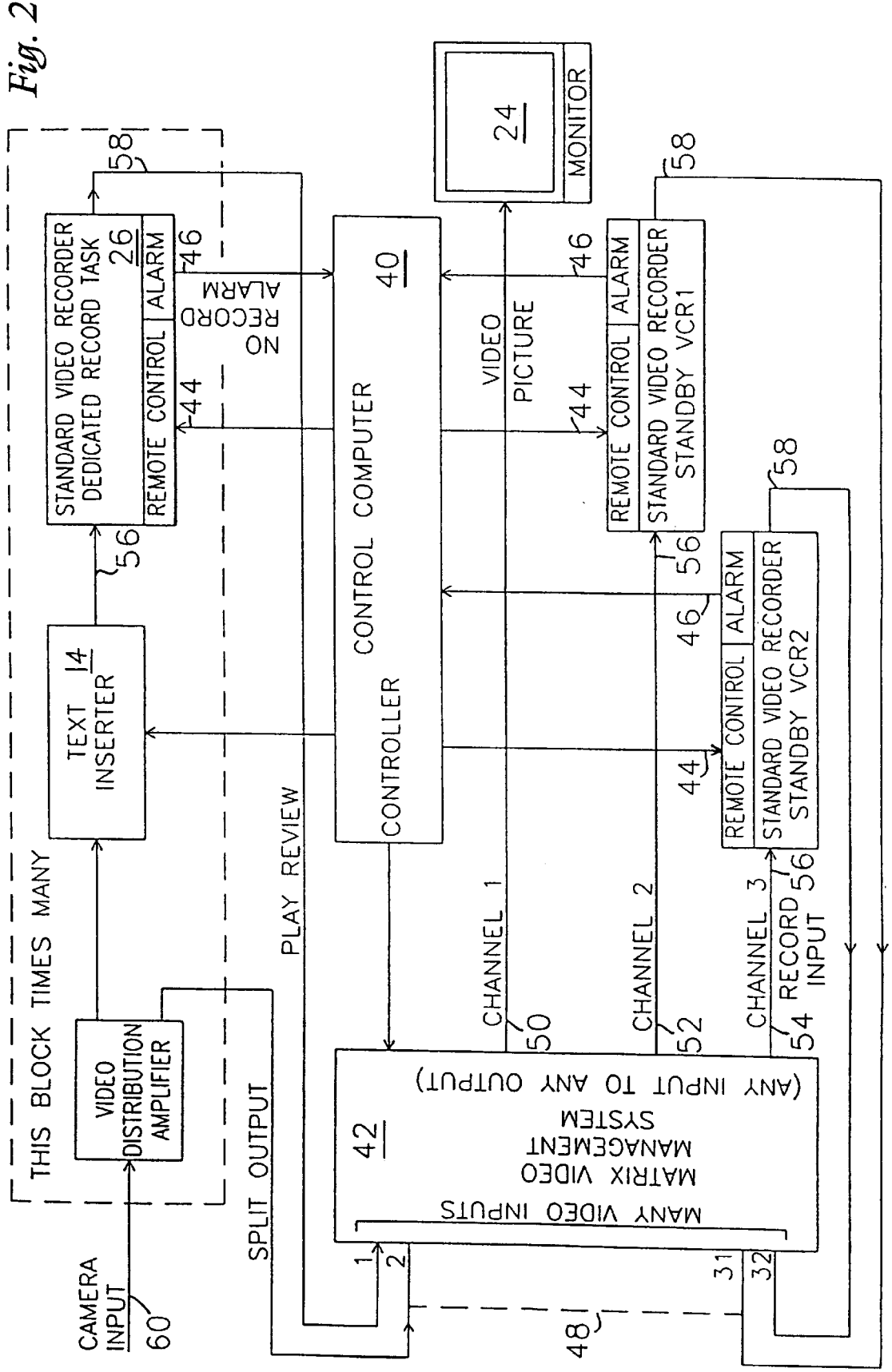
FIG. 2 is a block diagram of an automatic VCR management system in accordance with the present invention.

As shown in FIG. 2 the AVCRMS 12 comprises a controller 40 and a selector 42.

Typically the controller 40 is in the form of a computer programmed to effect certain control functions as described herein. The controller 40 is connected to a remote control input 44 of each of the plurality of VCRs 26 and 28 and to an alarm output 46 of each of the VCRs 26 and 28. The controller 40 being capable of operating each of the VCRs 26 and 28 via the remote control inputs 44 and also being capable of sensing an alarm condition in each of the VCRs 26 and 28 via the alarm outputs 46. The controller 40 disabling any one of the VCRs 26 and 28 upon the occurrence of an alarm signal at the alarm output 46 of that VCR 26 or 28. The alarm condition becomes active when the VCR 26 or 28 is no longer in a record mode of operation. This can happen due to failure of the VCR 26 or 28, the VCR 26 or 28 being taken out of service such as to change a recording tape or to review a recorded tape or for repairs or the like.

The selector 42 is typically in the form of a matrix video switch in which any of its inputs 48 can be connected to any of its outputs 50, 52 and 54. The output 50 is connected to one of the monitors 24, and the outputs 52 and 54 are connected to record input 56 of two standby VCRs 28. Each of the VCRs 26 and 28 has a play output 58 which is connected to one of the video inputs of the selector 42 so that any video signal on any of the VCRs 26 or 28 can be displayed on the monitor 24. The selector 42 is also connected via its inputs 48 to a plurality a video camera outputs 60.

Typically, when one of the VCRs is detected as no longer being in a record mode of operation the controller 40 causes an audible tone to be generated and an alarm message is caused to be displayed on the monitor 24. The message identifies which one of the VCRs 26 and 28 requires attention. The controller 40 simultaneously selects the next available one of the standby VCRs 28 and sets it to a record mode of operation via the remote control input 44 and controls the selector 42 to direct the video signal from the relevant video camera output 60 to that VCR 28 for recordal. The controller 40 also displays the identity of the video camera and the VCR 28 onto which the video signal is now being recorded. Simultaneously, this information, along with the time and date and any other special messages, are printed out on the printer 30.

Text Insertion System

As shown in FIGS. 2 and 3 the text inserter 14 is connected between the camera outputs 60 and the inputs 56 of the VCRs 26. The text inserter 14 is controlled by the controller 40 for the generation of text to be inserted into the video signal being recorded onto the VCR 26. The controller 40 controls the insertion of the text into the video signal at a location which is not ordinarily part of the visible part of the video screen once displayed. Typically, the text data is inserted into the horizontal line interval portion of the video signal (known as the "back porch" of the video signal).

The text inserter 14, particularly as shown in FIG. 3, inserts the text generated by the controller 40 into the video signal and is recorded onto the VCR 26 during recording. Due to the positioning of the text into the video signal the text does not overly the normal viewable portion of the video signal. During playback of the video signal from the VCR 26 the text inserter extracts the text from the horizontal line interval of the video signal and reinserts it into the visible portion of the video signal so that the text can be seen on the monitor 24.

In the event that the text masks important parts of the video image on the monitor 24 the text inserter 14 can be controlled by the controller 40 to remove the text signal from the visible part of the video signal. Hence, the text recorded with the video image from the video cameras can be removed from the video image seen on the monitor in the event that it masks important parts of the video image.

It is important to note that the text is a data stream and not a video stream.

The recorded information can include time, date, source, equalisation, operator identification number, VCR identification number (since each VCR has its own effective "fingerprint") and the like. This information is important in the scheme of irrefutably proving that the images recorded by the VCRs are the events which actually took place.

Transmission Cable Equalisation System

Figure 4A:
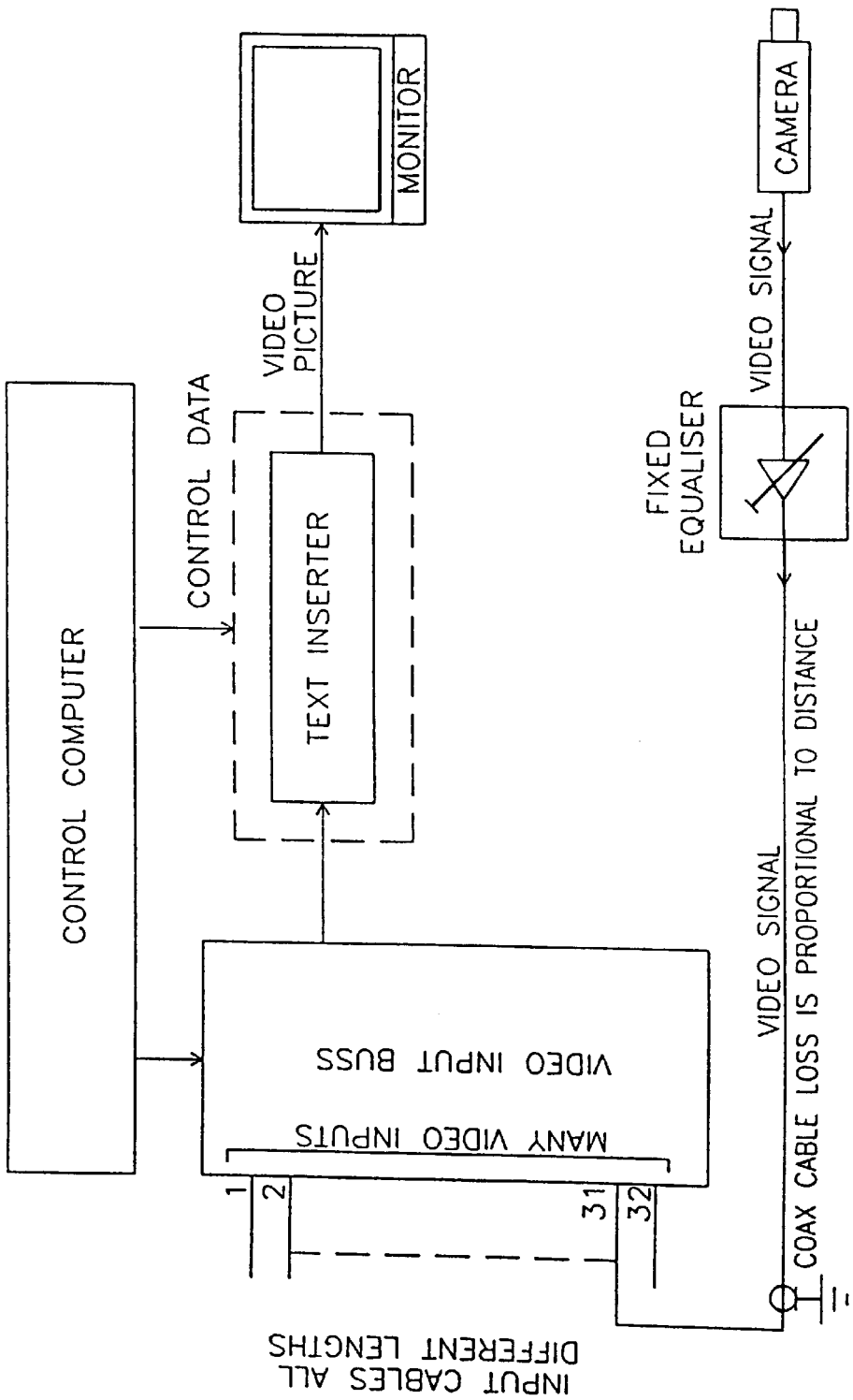
FIG. 4A is a block diagram of a prior art transmission cable equalisation system.
Figure 4B:
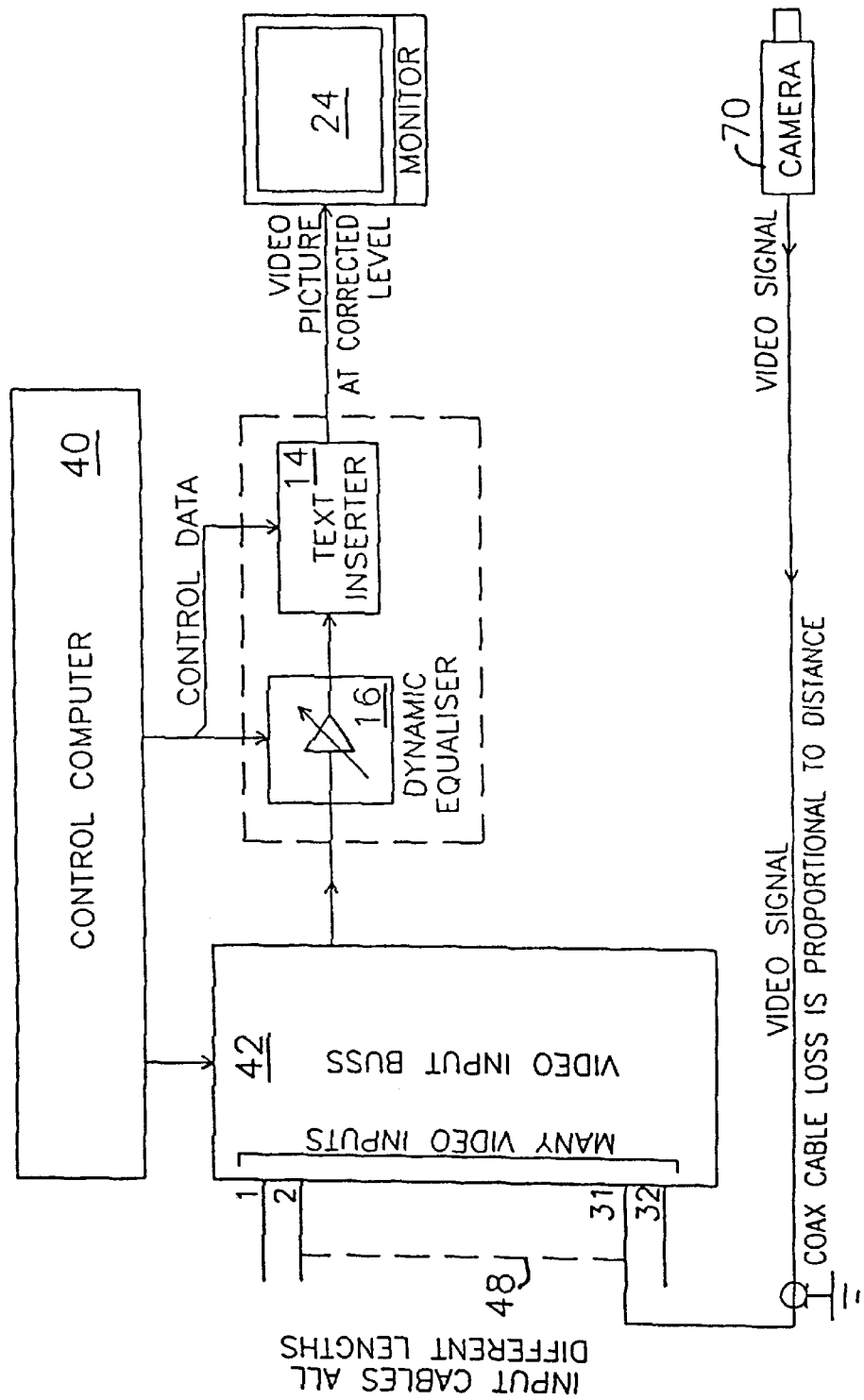
FIG. 4B is a block diagram of a transmission cable equalisation system in accordance with the present invention.
Figure 5:
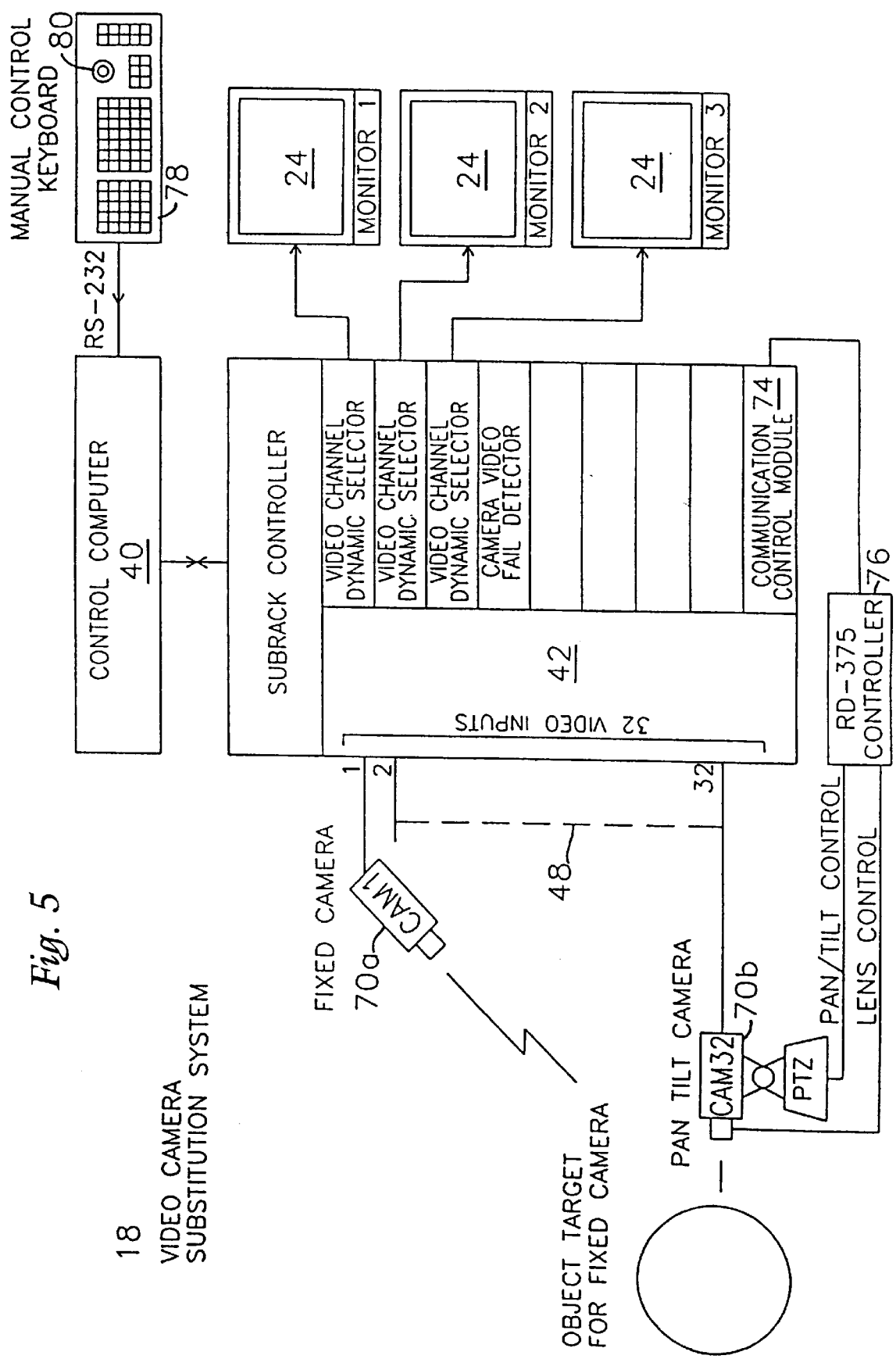
FIG. 5 is a block diagram of a video camera substitution system in accordance with the present invention; and, FIG. 6 is a perspective view of a PTZ camera in accordance with the present invention, shown with part of its housing shown in phantom.

As shown in FIGS. 1, 4a and 4b the transmission cable equaliser 16 is connected between the video camera output 60 and the text inserter 14 and is controlled by the controller 40.

The controller 40 has a conditioning signal (such as data) which characterises the nature of the connection between each of a plurality of video cameras 70 and the selector 42. This conditioning signal takes into account any losses in the connection between the camera 70 and the selector 42 due to the nature of a connecting cable including its transmission characteristics and its length. The conditioning signal is applied to the equaliser 16 so as to alter the gain of the equaliser 16 to allow for the losses inherent in the cable of each of the cameras 70.

Hence, only one equaliser 16 is required per monitor 24 rather than one equaliser 16 per camera 70. In the event that a new camera 70 is added to the video security system 10 the equalising requirements for that camera 70 are input into the controller 40 for controlling the equaliser 16 when video signals from that camera 70 are being viewed on the monitor 24.

Video Camera Substitution System

The cameras 70 in the video security system 10 include fixed position cameras 70*a* and pan/tilt cameras 70*b* (herein referred to as PTZ cameras 70*b*). Typically, a plurality of the fixed position cameras 70*a* are directed at fixed targets in an area and a lesser number of the PTZ cameras 70*b* are spread out amongst the fixed position cameras 70*a* so that the PTZ cameras 70*b* can substantially view the same field as the plurality of fixed position cameras 70*a* and to be used to view moving targets.

The video camera substitution system 18 is a part of the controller 40 and has information concerning the relative positions of the PTZ cameras 70*b* and the fixed position cameras 70*a*. The information includes which of the PTZ cameras 70*b* are capable of covering the viewing areas of each of the fixed position cameras 70*a*. The controller 40 is connected to the PTZ cameras 70*b* via a communication control module 74 so that in the event that a particular one of the fixed position cameras 70*a* ceases to operate the controller can automatically determine which one of the PTZ cameras 70*b* can be used in its place and then control the PTZ camera 70*b* via its controller 76 to pan, tilt, zoom and focus to view the target viewed by the camera 70*a* which failed.

The VCSS 18 also has a keyboard 78 connected to the controller 40 for allowing manual operation of the PTZ cameras 70*b* to view targets at the will of an operator of the keyboard 78. For this purpose the keyboard 78 conveniently includes a joy stick 80.

Multiple Rotation Video Camera

The PTZ cameras 70*b* comprise a conventional camera 100 set on a transport mechanism 102 which is capable of rotating greater than 360° such as about 1000°.

The camera 100 has a lens 110 which has a zoom facility and whose iris can be adjusted for changes in lighting levels.

The transport mechanism 102 has a housing 120, a frame 122, a vertical axis drive unit 124, a horizontal axis drive unit 126 and control unit 128.

The housing 120 comprises a ceiling mount 140, a camera mask 142 and a transparent cover 144.

The ceiling mount 140 is typically fixed into a ceiling of a building (although it could be fixed to a wall or the like) so that the camera mask 142 and the transparent cover 144 are disposed below the ceiling for allowing the camera 100 viewing within a room under the ceiling. The ceiling mount 140 is typically made from anodised aluminium and is typically cylindrical in cross-section.

The camera mask 142 is attached to the frame 122 and hence is able to rotate with respect to the ceiling mount 140. The camera mask 142 has a slot 150 which is dimensioned to allow the lens 110 to have a clear uninterrupted view through it. The slot 150 extends substantially from a horizontal position with respect to the lens 110 to a vertically downward position with respect to the lens 110. Hence, the lens can be moved from a horizontal viewing position to a vertically downward viewing position in the slot 150. The camera mask 142 has a plurality of lugs 152 for use in releasably attaching the camera mask 142 to clips 154 of two mask mounts 156 (one of which is shown) of the frame 122.

Typically, the camera mask 142 is coloured black so as to avoid reflecting light from it. The purpose of the camera mask 142 is to rotate with the camera 100 to mask observation of the viewing position of the camera 100. We have discovered that due to the darkness of the camera mask 142 the viewing position of the camera 100 is substantially unobservable.

The transparent cover 144 is attached to the ceiling mount 140 and located outside of the camera mask 142. The purpose of the transparent cover 144 is to shield the camera 100 and the interior of the transport mechanism 102 from the elements. In this manner the cover 144 can be hermetically sealed to the ceiling mount 140 and the PTZ camera 70*b* can be located out doors.

The frame 122 comprises a top plate 160, two brackets 162 and 164 and a moveable platform 166. The top plate 160 is disposed horizontally and is able to rotate inside the housing 120. The brackets 162 and 164 are fixed to the top plate 160 and disposed vertically downwardly therefrom. The platform 166 is conveniently substantially U-shaped and pivotably attached to lower ends of the brackets 162 and 164. The pivotable attachment is via a pivot bolt 170 located through the bracket 162 and a pivot axle 172 located through the bracket 164. The platform 166 has a plurality of fixing slots 176 for mounting the camera 100 onto it. The fixing slots 176 are typically disposed parallel to the brackets 162 and 164.

The vertical axis drive unit 124 comprises a drive motor 180 with a drive cog 182, a toothed cog 184 and a toothed belt 186. The toothed cog 184 is releasably secured to the ceiling plate 140, such as by holes (not shown) in a top 188 of the toothed cog 184. The drive motor 180 is attached to the top plate 160 of the frame 122. The drive motor 180 is driven by electrical signals from the control unit 128 for producing rotation of the drive cog 182. Since the toothed cog 184 is stationary with respect to the ceiling mount 140 rotation of the drive cog 182 causes the frame 122 to rotate within the housing 120. The speed of rotation of the frame 122 is dependent upon the speed of the drive cog 182 and the angle of rotation is dependent upon the time for which the drive motor 180 receives signals from the control unit 128.

The horizontal axis drive unit 126 comprises a drive motor 200 with a drive cog 202, a toothed cog 204 and a toothed belt 206. The toothed cog 204 is fixed to the platform 166 so that rotation of the toothed cog 204 produces pivoting of the platform 166. The drive motor 200 is mounted onto the bracket 164 and the drive cog 202 drives the toothed belt 206 for driving the toothed cog 204. The toothed cog 204 has a stop 210 located in it for limiting the pivotable travel of the platform 166 so as to protect the camera 100 from damage which may otherwise occur. The drive motor 200 is controlled by signals from the control unit 128 for pivoting the lens 110 of the camera 100 in the slot 150 of the camera mask 142 as indicated by arrow 212. Typically, the horizontal drive unit 126 allows pivoting of the platform 166 from substantially horizontal to substantially vertical.

The control unit 128 has a horizontal control unit and a vertical control unit. Each of the horizontal and vertical control units has a position sensor device for determining the position of the toothed cogs 204 and 184 respectively. Typically, the position sensor device is a hole located in the toothed cog 184, 204 and the control unit are able to count up and down from the position of the holes for determining the movement of the cogs 184, 204.

We have discovered that in order to quickly move the camera 100 from one viewing position to another, and to keep accurate count of the actual position of the camera 100 there are some physical constraints which must be allowed for. Principally this involves controlling the drive motors 180 and 200 so as not to exceed maximum rates of acceleration and deceleration and not to exceed a maximum speed. Also, and most importantly, we have discovered that the drive motors 180 and 200 need to be controlled so as to have a period of substantially zero acceleration between periods of acceleration and deceleration. This is required because otherwise there is a very large change in the momentum of the transport mechanism 102 required in switching from acceleration to deceleration. The result of such abrupt changes in the acceleration of the transport mechanism is the control unit 128 looses count of the position of the toothed cogs 184 and 204 and thus inaccuracies in the location of the camera 100 are experienced.

Hence, the control unit 128 is programmed to limit the maximum rate of acceleration and deceleration of the drive motors 180 and 200 and to provide a minimum period of substantially zero acceleration between periods of acceleration and deceleration. The control unit 128 then uses these limits to drive the transport mechanism 102 between viewing locations whilst accurately reaching those viewing locations.

The PTZ camera 70b is, in one embodiment, connected to the remainder of the video security system 10 by a plurality of cables. The cables carry video signals, control signals and electrical power. In order to allow the transport mechanism 102 to rotate through greater than 360° the cables are arranged in a loop so that they can be twisted three or four times without damage. This allows the vertical axis drive unit 124 to rotate the platform 166 through a total angle of about 1000°.

The control unit 128 has a counter to count up and down depending upon the position and motion of the drive motor 180. Typically, the counter increments the count by 4000 for each 360° of rotation. By such counting the control unit 128 can be aware of how far the transport mechanism 102 is away from its ultimate end of travel. The control unit 128 is programmed such that when the camera 100 is not engaged in tracking a moving event it unwinds to proximate the middle of its 1000° of angular travel. In this way the chances of the transport mechanism 102 reaching its ultimate angular travel is greatly reduced.

In another embodiment slip rings are used for each cable, which then allows the vertical axis drive unit 124 to rotate the platform 166 through an infinite angle of rotation.

Hence, the PTZ camera 70b can be used to follow a target even where the target travels through an angle of greater than 360° and hence the chances of the PTZ camera 70b being run up against its limits of rotation are greatly reduced and the ability to follow a target as it moves through an area is greatly enhanced.

SWITCHING BETWEEN VIEWING LOCATIONS

The controller 40 controls the PTZ cameras 70b to move back and forth between a plurality of viewing locations so that the camera can monitor a plurality of fixed locations.

Figure 6:
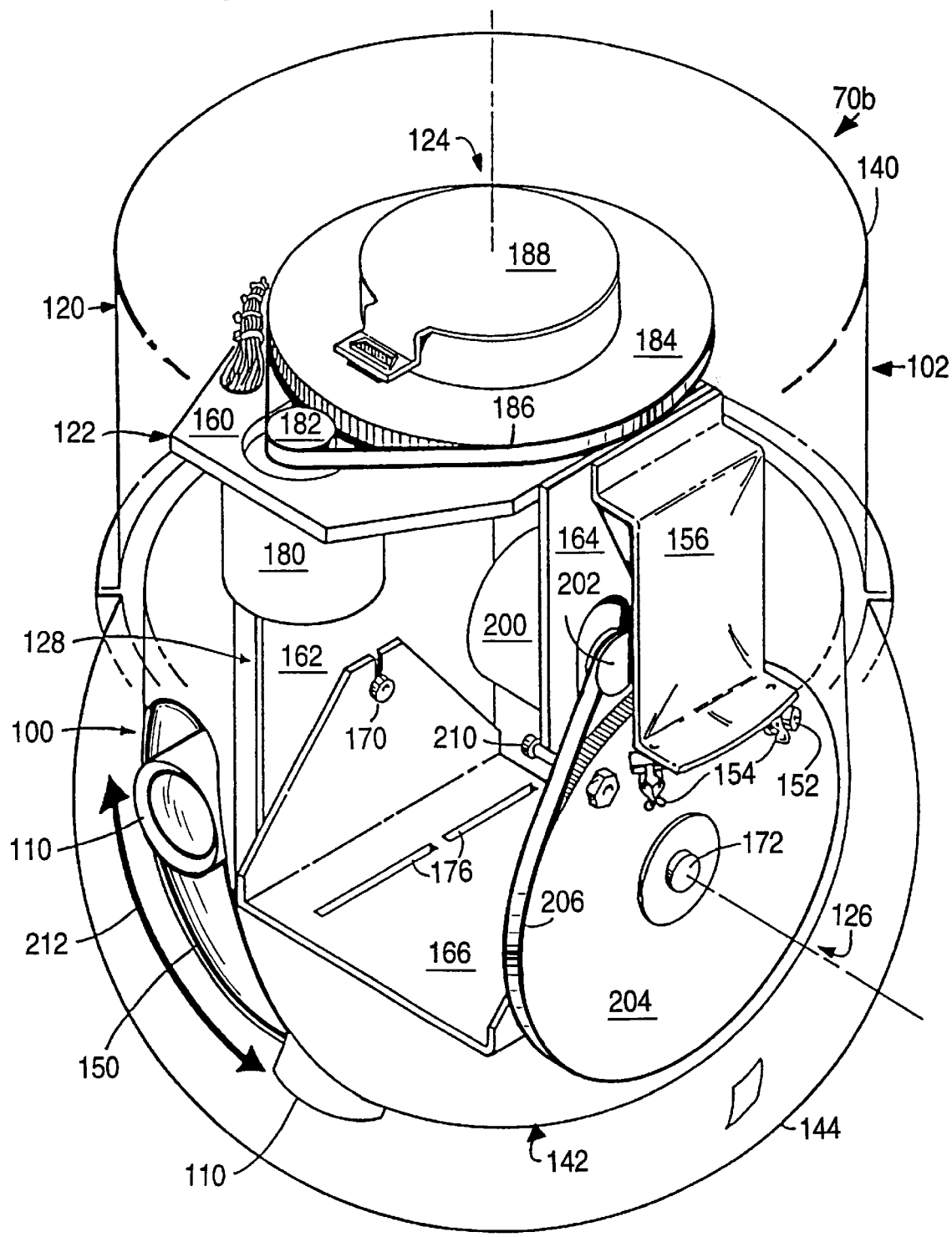

The PTZ camera 70b comprises a video lens 110 and camera 100, a zoom control, a focus control, a pan control, a tilt control and a camera position controller (included in the controller unit 128—FIG. 6).

The video lens and camera is settable to view a target. For example, the target could be a person at a gaming table in a casino. The video lens has a machine readable signal corresponding to its zoom and focus setting. The zoom and focus controls allow adjustment of the zoom and focus of the video lens and camera.

The pan and tilt controls control the pan and tilt of the video lens and camera about substantially vertical and horizontal axes for viewing targets typically in a region of 360° about the PTZ camera. The pan and tilt controls each have a machine readable signal corresponding to their settings.

The camera position controller is coupled to respond to the machine readable signals from the video lens and camera, the zoom and focus controls and the pan and tilt controls. The camera position controller controls the settings of the video lens, the zoom and focus controls and the pan and tilt controls for viewing the targets within the viewing region automatically under the instruction of an operator.

The camera position controller has a first memory register (such as located in a computer) to store the values of the machine readable signals corresponding to the settings of the video lens and camera, the zoom and focus controls and the pan and tilt controls. The first memory register stores the values of the settings corresponding to a first location of temporary interest, such as the location of a handbag. The camera position controller also has a second memory register for storing the values corresponding to a second location of temporary interest, such as the location of a suspected felon who is believed to be about to steal the handbag.

The camera position controller has a toggle button which is operable to cause the values of the settings of the video lens and camera corresponding to the second location to be recalled from the second memory register and loaded into the video lens and camera whilst the values corresponding to the first location are removed from the video lens and camera and stored into the first memory register. The toggle button is also operable to cause the values of the settings to be updated in the event that one of the targets moves or the operator chooses a new target of temporary interest. The toggle button also allows for switching viewing between the two locations of temporary interest. By so doing the camera position controller can control the video lens and camera to view between two (or more) desired locations without continual manual re-adjustment of the video lens, the zoom and focus controls or the pan and tilt controls.

In use, an operator can set a desired location of temporary interest to be monitored by the video lens and camera. The video lens 110 and camera 100 can then be manually moved to view another location of temporary interest and the video lens 110 and camera 100 can then by toggled between the two viewing locations by the operation of the toggle button.

To achieve this the operator first manually pans and tilts the video lens 110 and camera 100 to view a first target at a first location of temporary interest. Then the operator manually adjust the zoom and focus of the video lens 110 and camera 100 for the target. The operator then presses the toggle button to store the values of the settings of the zoom and focus controls and the pan and tilt controls into the first memory register. The operator can then manually control the zoom and focus controls and the pan and tilt controls for setting the video lens 110 and camera 100 to view a second target at a second location of temporary interest. When the operator again presses the toggle button the values of the settings corresponding to the second location are stored into the second memory register and the values of the settings corresponding to the first viewing location are recalled from the first memory register and used to control the video lens 110 and camera 100. Once the values are exchanged the camera position controller controls the zoom and focus controls and the pan and tilt controls to reposition the viewing location of the video lens 110 and camera 100.

The location of the targets can be updated by manually adjusting the zoom and focus controls and the pan and tilt controls for the video lens 110 and camera 100 and pressing the toggle button again to update the values stored in the relevant memory register. That is, when no manual adjustments are made to the settings of the video lens 110 and camera 100 the toggle button causes toggling between the two locations of temporary interest, but when manual adjustments are made to the settings of the video lens 110 and camera 100 the toggle button causes updating of the values of the settings.

Thus a PTZ camera can be used to monitor two fixed locations within a viewing area, as well as to operate under fully manual control. Hence, the PTZ camera of the present invention is the equivalent of two fixed position cameras which can be set to view locations of temporary interest and which can be set to new locations of temporary interest as desired by an operator. That is, the PTZ camera function as the equivalent of two dynamically positioned fixed cameras. Also, the change time in changing between the two viewing locations is about the same as the time involved in changing viewing between two fixed cameras (that is, less than 1 second).

Typically, the camera position controller is configured to set the last viewing position as being any position at which the operator stopped for greater than, say, 1 second.

This facility could be configured into a logical data stack so that the last, say 10, viewing positions could be stored in memory are recalled sequentially (this feature is herein referred to as "back up").

Modifications and variations such as would be apparent to a skill addressee are considered within the scope of the present invention. For example, the camera position controller could have a single switch to control toggling between two camera locations. Also, the iris setting of the video lens and camera could also be controlled.

We claim:

1. A video recording system, comprising:
    a video camera for generating video signals;
    a first video recording unit for receiving and recording the video signals from said video camera;
    a second video recording unit for receiving and recording the video signals from said video camera; and
    a controller connected to direct the video signals from said video camera to at least one of said first video recording unit and said second video recording unit, said controller generating a log indicating which of said first video recording unit and said second video recording unit received the video signals from said video camera for recording and the time period that said respective video recording unit received the video signals from said video camera.

2. The video recording system according to claim 1, wherein the log generated by said controller is a printed log.

3. A video recording system, comprising:
    a video camera for generating video signals;
    a primary video recording unit for receiving the video signals from said video camera, said primary video recording unit further having a record mode of operation for recording the video signals from said video camera;
    a back-up video recording unit for receiving and recording the video signals from said video camera; and
    a controller connected to sense when said primary video recording unit is not in the record mode of operation, said controller further directing the video signals from said video camera to said back-up video recording unit upon sensing that said primary video recording unit is not in the record mode of operation.

4. The video recording system according to claim 3, wherein said primary video recording unit generates an alarm signal when the primary video recording unit is not in the record mode of operation, and wherein said controller senses when said primary video recording unit is not in the record mode of operation by sensing the alarm signal from said primary video recording unit.

5. The video recording system according to claim 3, wherein said back-up video recording unit has a back-up unit record mode of operation, and wherein said controller further places the back-up video recording unit into the back-up unit record mode of operation up on sensing when said primary video recording unit is not in the record mode of operation.

6. The video recording system according to claim 3, wherein said controller further generates a log indicating which of said primary video recording unit and said back-up video recording unit received the video signals from said video camera for recording and the time period that said respective video recording unit received the video signals from said video camera.

7. The video recording system according to claim 6, wherein the log generated by said controller is a printed log.

8. A video recording system, comprising:
    a video camera for generating video signals;
    a primary video recording unit for receiving the video signals from said video camera, said primary video recording unit having a record mode of operation for recording of the video signals from said video camera;
    a plurality of back-up video recording units for receiving the video signals from said video camera, each of said plurality of back-up video recording units having an available status when said respective back-up video recording unit is available to record the video signals from said video camera; and
    a controller connected to sense when said primary video recording unit is not in the record mode of operation, said controller further directing the video signals from said video camera to one of said plurality of back-up recording units which is in the available status for recording upon sensing that said primary video recording unit is not in the record mode of operation.

9. The video recording system according to claim 8, wherein said primary video recording unit generates an alarm signal when the primary video recording unit is not in the record mode of operation, and wherein said controller senses when said primary video recording unit is not in the record mode of operation by sensing the alarm signal from said primary video recording unit.

10. The video recording system according to claim 8, wherein each of said plurality of back-up video recording units has a back-up unit record mode of operation, and wherein said controller places the one of said plurality of back-up video recording units receiving the video signals from said video camera into the back-up unit record mode of operation upon sensing when said primary video recording unit is not in the record mode of operation.

11. The video recording system according to claim 8, wherein said controller further generates a log indicating which of said primary video recording unit and said plurality of back-up video recording units received the video signals from said video camera for recording and the time period that said respective video recording unit received the video signals from said video camera.

12. The video recording system according to claim 11, wherein the log generated by said controller is a printed log.

13. The video recording system according to claim 8, wherein each of said plurality of back-up video recording units has a back-up unit record mode of operation, and wherein said controller senses when one of said plurality of back-up video recording units receiving the video signals from said video camera is not in the back-up unit record mode of operation directs the video signals intended for the one of said plurality of back-up video recording units not in the back-up unit record mode of operation to the next available one of said plurality of back-up video recording units.

14. The video recording system according to claim 13, wherein each of said plurality of back-up video recording units generates a back-up alarm signal when the back-up video recording units is not in the back-up unit record mode of operation, and wherein said controller senses when each of said plurality of back-up video recording units is not in the back-up record mode of operation by sensing the back-up alarm signal from the respective one of said plurality of back-up video recording units.

15. A video recording system, comprising:
a plurality of video cameras for generating video signals;
a plurality of primary video recording units for receiving the video signals from an associated one of said plurality of video cameras, each of said plurality of video recording units having a record mode of operation for recording the video signals from the associated one of said plurality of video cameras;
a back-up video recording unit for receiving and recording the video signals from said plurality of video cameras; and
a controller connected to sense when any particular one of said plurality of primary video recording units is not in the record mode of operation, said controller further directing the video signals from the one of said plurality of primary video cameras associated with the particular one of said plurality of primary video recording units that is not in the record mode of operation to said back-up video recording unit upon sensing that the particular one of said plurality of primary video recording units is not in the record mode of operation.

16. The video recording system according to claim 15, wherein each of said plurality of primary video recording units generates an alarm signal when the respective primary video recording unit is not in the record mode of operation, and wherein said controller senses when each of said plurality of primary video recording units is not in the record mode of operation by sensing the alarm signal from the respective one of said plurality of primary video recording units.

17. The video recording system according to claim 15, wherein said back-up video recording unit has a back-up unit record mode of operation, and wherein said controller places the back-up video recording unit into the back-up unit record mode of operation upon directing video signals to said back-up video recording unit.

18. The video recording system according to claim 15, wherein said controller further generates a log indicating which of said plurality of primary video recording units and said back-up video recording unit received the video signals from each of said plurality of video camera for recording and the time period that said respective video recording unit received the video signals from the respective one of said plurality of video cameras.

19. The video recording system according to claim 18, wherein the log generated by said controller is a printed log.

20. A video recording system, comprising:
a plurality of video cameras for generating video signals;
a plurality of primary video recording units for receiving the video signals from an associated one of said plurality of video cameras, each of said plurality of video recording units having a record mode of operation for recording the video signals from the associated one of said plurality of video cameras;
a plurality of back-up video recording units for receiving the video signals from said plurality of video cameras, each of said back-up video recording units having means for placing it in an available status when said respective back-up video recording unit is available to record the video signals from one of said plurality of video cameras; and
a controller connected to sense when any particular one of said plurality of primary video recording units is not in the record mode of operation, said controller directing the video signals from the one of said plurality of video cameras associated with the particular one of said plurality of primary video recording units that is not in the record mode of operation to one of said plurality of back-up video recording units being in the available status for recording upon sensing that the particular one of said plurality of primary video recording units is not in the record mode of operation.

21. The video recording system according to claim 20, wherein each of said plurality of primary video recording units generates an alarm signal when the respective primary video recording unit is not in the record mode of operation, and wherein said controller senses when each of said plurality of primary video recording units is not in the record mode of operation by sensing the alarm signal from the respective one of said plurality of primary video recording units.

22. The video recording system according to claim 20, wherein each of said plurality of back-up video recording units has a back-up unit record mode of operation, and wherein said controller has means for placing the one of said plurality of back-up video recording units receiving the video signals from the one of said plurality of video cameras associated with the primary video recording unit not in the record mode of operation into the back-up unit record mode of operation.

23. The video recording system according to claim 20, wherein each of said plurality of back-up video recording units has a back-up unit record mode of operation, and wherein said controller senses when each of said plurality of back-up video recording units is not in the back-up unit record mode of operation and directs the video signals intended for the one of said plurality of back-up video recording units not in the back-up unit record mode of operation to the next available one of said plurality of back-up video recording units.

24. The video recording system according to claim 20, wherein each of said plurality of back-up video recording units generates a back-up alarm signal when an associated one of the back-up video recording units is not in the back-up unit record mode of operation, and wherein said controller senses when each of said plurality of back-up video recording units is not in the back-up record mode of operation by sensing the back-up alarm signal from the respective one of said plurality of back-up video recording units.

25. The video recording system according to claim 20, wherein said controller generates a log indicating which of said plurality of primary video recording units and said plurality of back-up video recording units received the video signals from each of said plurality of video cameras for recording and the time period that said respective video recording unit received the video signals from said respective video camera.

26. The video recording system according to claim 25, wherein the log generated by said controller is a printed log.

* * * * *